United States Patent
Gan et al.

(10) Patent No.: US 7,776,470 B2
(45) Date of Patent: Aug. 17, 2010

(54) ANODE-TO-CATHODE CAPACITY RATIOS FOR SVO/$CF_x$ HYBRID CATHODE ELECTROCHEMICAL CELLS

(75) Inventors: Hong Gan, Williamsville, NY (US); Robert S. Rubino, Williamsville, NY (US); Esther S. Takeuchi, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 995 days.

(21) Appl. No.: 11/535,139

(22) Filed: Sep. 26, 2006

(65) Prior Publication Data
US 2007/0072075 A1 Mar. 29, 2007

Related U.S. Application Data

(60) Provisional application No. 60/721,219, filed on Sep. 28, 2005.

(51) Int. Cl.
*H01M 4/02* (2006.01)
(52) U.S. Cl. .................. 429/209; 429/219; 429/220; 429/221; 429/223; 429/224; 429/231.5; 429/231.7; 429/241; 429/245
(58) Field of Classification Search ............... 429/209, 429/219, 220, 221, 223, 224, 231.1, 231.5, 429/231.7, 241, 245
See application file for complete search history.

(56) References Cited

U.S. PATENT DOCUMENTS

| | | | |
|---|---|---|---|
| 4,310,609 A | 1/1982 | Liang et al. | |
| 4,830,940 A | 5/1989 | Keister et al. | |
| 5,472,810 A | 12/1995 | Takeuchi et al. | |
| 5,516,340 A | 5/1996 | Takeuchi et al. | |
| 5,716,728 A | 2/1998 | Smesko et al. | |
| 6,171,729 B1 | 1/2001 | Gan et al. | |
| 6,235,429 B1 | 5/2001 | Kobayashi et al. | |
| 6,451,483 B1 | 9/2002 | Probst et al. | |
| 6,551,747 B1 | 4/2003 | Gan | |
| 2001/0038943 A1* | 11/2001 | Spillman et al. | 429/149 |
| 2002/0132167 A1* | 9/2002 | Gan et al. | 429/241 |
| 2003/0124427 A1 | 7/2003 | Takeuchi et al. | |
| 2003/0129484 A1* | 7/2003 | Gan et al. | 429/128 |
| 2003/0215720 A1 | 11/2003 | Shembel et al. | |

FOREIGN PATENT DOCUMENTS

| | | |
|---|---|---|
| EP | 0 930 664 A2 | 10/1998 |
| EP | 1 207 567 A2 | 11/2001 |

(Continued)

*Primary Examiner*—Patrick Ryan
*Assistant Examiner*—Ben Lewis
(74) *Attorney, Agent, or Firm*—Michael F. Scalise

(57) ABSTRACT

Improvements in the performance of lithium electrochemical cells comprising a first cathode active material of a relatively high energy density but of a relatively low rate capability, for example $CF_x$, contacted to one side of a current collector and with a second cathode active material having a relatively low energy density but of a relatively high rate capability, for example SVO, contacted to the opposite current collector side are described. An exemplary cathode has the configuration: SVO/first current collector/$CF_x$/second current collector/SVO, and wherein the anodic coulombic capacity does not exceed the total coulombic capacities of the SVO and $CF_x$ by greater than 25%. Manganese oxide ($MnO_2$) is another typically used cathode active material in lieu of SVO, and the present invention is applicable to lithium cells of that system as well.

14 Claims, 1 Drawing Sheet

FOREIGN PATENT DOCUMENTS

| | | |
|---|---|---|
| EP | 1 313 159 A2 | 12/2001 |
| EP | 1 309 023 A2 | 11/2002 |
| EP | 1 310 271 A2 | 11/2002 |
| EP | 1 324 406 A2 | 12/2002 |
| EP | 1 460 700 A2 | 3/2004 |

* cited by examiner

ANODE-TO-CATHODE CAPACITY RATIOS FOR SVO/CF$_x$ HYBRID CATHODE ELECTROCHEMICAL CELLS

CROSS-REFERENCE TO RELATED APPLICATION

This application claims priority from provisional application Ser. No. 60/721,219, filed Sep. 28, 2005.

BACKGROUND OF THE INVENTION

1. Field of Invention

This invention relates to the conversion of chemical energy to electrical energy. In particular, the present invention relates to an electrochemical cell whose anode is composed of lithium or some alloy thereof. The cathode is composed of silver vanadium oxide (SVO) and carbon monofluoride (CF$_x$) and the cell is particularly useful in implantable medical devices that require a pulsatile power source, such as an implantable cardioverter defibrillator (ICD). The invention specifically relates to the ratio of the capacity of the anode material in the cell to the capacity of the respective cathode materials.

2. Prior Art

Implantable cardioverter defibrillators are typically powered by cells containing a lithium anode and a silver vanadium oxide cathode. The Li/SVO cell chemistry provides high energy density, excellent reliability, and the high power pulse capability required by the defibrillator application. In certain cases, however, these cells exhibit middle-of-life voltage delay accompanied by a permanent increase in impedance (Rdc growth). This results in an increased time to charge the ICD's capacitors. Time between detection of a heart arrhythmia and therapy is critical to the effectiveness of an ICD. Thus, there is potential for impedance growth in the Li/SVO cell that limits the effectiveness of the implantable device.

In addition, it is desirable to use discharge voltage to indicate when the cell is nearing the end of its life. This is because it is important to have sufficient time and discharge capacity between the point at which the user is warned that the cell must be replaced and the time at which the cell is no longer functional. Failure to do so could result in device failure if the patient is unable to replace the device power source in time. The current state-of-the art Li/SVO power source discharges in two distinct voltage plateaus. Under some circumstances, it is difficult to select an appropriate replacement voltage because the cell may rapidly lose pulse capability after the second discharge plateau. To avoid that, it is desirable to select a voltage on or above the second discharge plateau. However, this results in a substantial loss of useful capacity, which, in turn, adversely impacts cell longevity.

These problems can be mitigated by using an excess of cathode material in the cell so that the anode is consumed before the cell voltage drops to the second discharge plateau. However, the extra cathode material consumes space resulting in decreased energy density. Thus, either the cell longevity is reduced or a larger cell must be used. Both compromises are undesirable in an implantable medical application. It is desirable, therefore, to have a cell with low impedance growth, a clear replacement indicator and high energy density.

SUMMARY OF THE INVENTION

Accordingly, the present invention is directed to improvements in the performance of lithium electrochemical cells comprising a first cathode active material of a relatively high energy density but of a relatively low rate capability, for example CF$_x$, contacted to one side of a current collector and with a second cathode active material having a relatively low energy density but of a relatively high rate capability, for example SVO, contacted to the opposite current collector side. Such an exemplary cathode design might look like: SVO/current collector/CF$_x$ or SVO/first current collector/CF$_x$/second current collector/SVO. Manganese oxide (MnO$_2$) is another typically used cathode active material in lieu of SVO, and the present invention is applicable to lithium cells of that system as well.

These and other objects of the present invention will become increasingly more apparent to those skilled in the art by reference to the following description and the appended drawings.

DETAILED DESCRIPTION OF THE PREFERRED EMBODIMENTS

Figure 1:
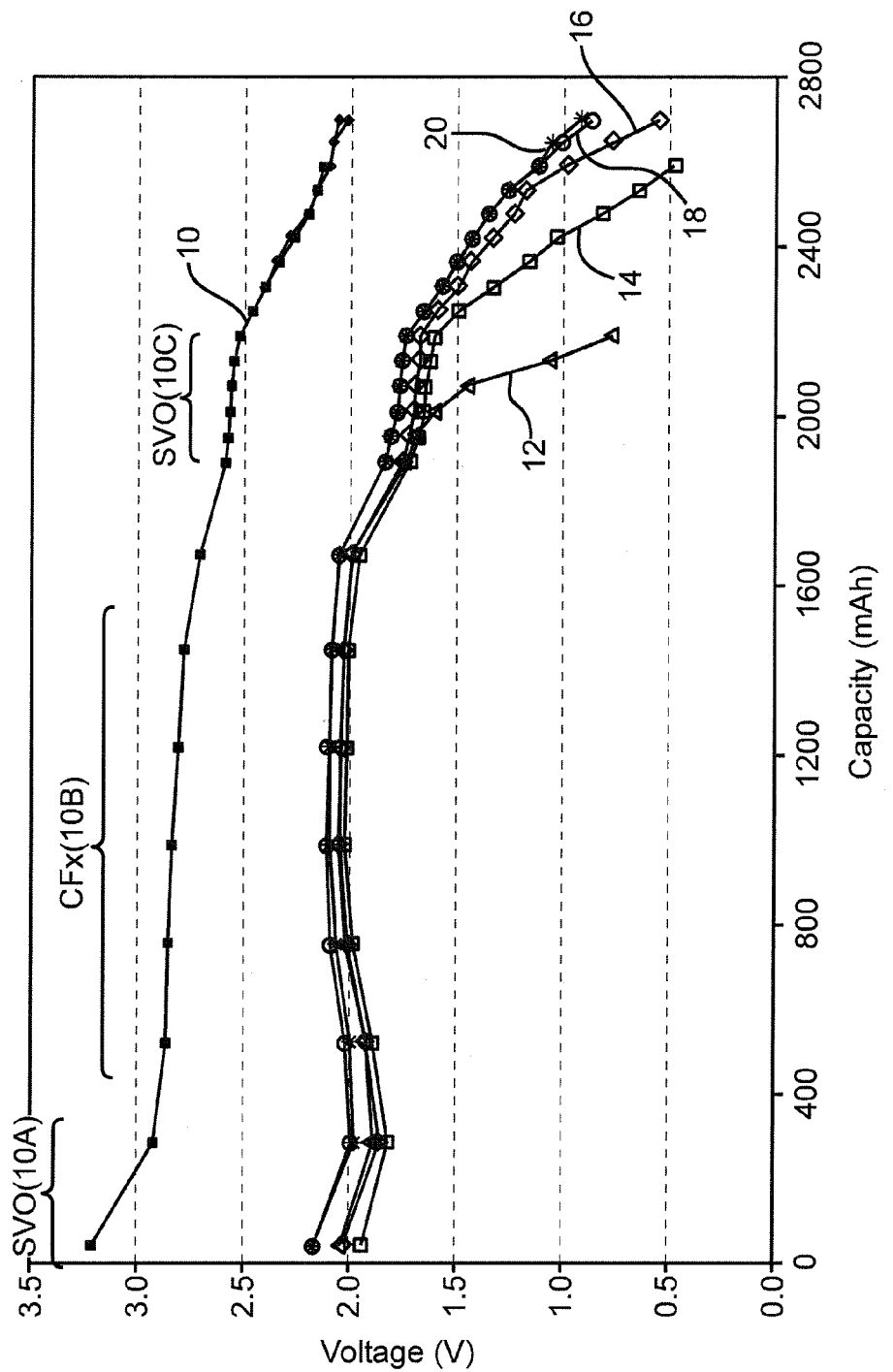
FIG. 1 is a graph of constructed from the background and pulse voltages of lithium cells of a SVO/current collector/CF$_x$/current collector/SVO design having various anode-to-cathode capacity ratios.

The term depth-of-discharge (DoD) is the ratio of delivered capacity to theoretical capacity times 100.

The term "pulse" means a short burst of electrical current of significantly greater amplitude than that of a pre-pulse current immediately prior to the pulse. A pulse train consists of at least one pulse of electrical current. If the pulse train consists of more than one pulse, they are delivered in relatively short succession with or without open circuit rest between the pulses. An exemplary pulse train may consist of four 10-second pulses (23.2 mA/cm$^2$) with about a 10 to 30 second rest, preferably about 15 second rest, between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10 second pulse is suitable for medical implantable applications. However, it could be significantly shorter or longer depending on the specific cell design and chemistry. Current densities are based on square centimeters of the cathode electrode.

An electrochemical cell according to the present invention comprises an anode of lithium and its alloys and intermetallic compounds including, for example, Li—Si, Li—Al, Li—B, Li—Mg, and Li—Si—B. Lithium—aluminum is the preferred alloy. The greater the amounts of aluminum present by weight in the alloy, however, the lower the energy density of the cell. The anode is a thin metal sheet or foil of the anode metal, pressed or rolled into contact with a metallic anode current collector, i.e., preferably comprising titanium, titanium alloy or nickel. Copper, tungsten and tantalum are also suitable materials for the anode current collector. Typically the anode current collector has an integral extending tab or lead contacted by a weld to a cell case of conductive metal in a case-negative electrical configuration.

The electrochemical cell further comprises a cathode of electrically conductive materials which serve as the other electrode of the cell. The cathode is preferably of solid materials and the electrochemical reaction at the cathode involves conversion of ions which migrate from the anode to the cathode into atomic or molecular forms. The solid cathode may comprise a first active material of a carbonaceous chemistry and a second active material of a metal element, a metal oxide, a mixed metal oxide and a metal sulfide, and combinations thereof. The metal oxide, the mixed metal oxide and the metal sulfide of the second active material have a relatively lower energy density but a relatively higher rate capability than the first carbonaceous active material.

More particularly, the first active material, which is of a relatively higher energy density and a relatively low rate capability in comparison to the second cathode active material, is preferably a carbonaceous compound prepared from carbon and fluorine. This includes graphitic and non-graphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely. Throughout this disclosure, the preferred high energy density material is referred to as having the stoichiometric formula $CF_x$. However, it is intended that $CF_x$ and $(C_2F)_n$ are interchangeable for purposes of the present invention including the claims.

The sandwich cathode design of the present invention further includes a second active material formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds. A preferred second cathode active material is a reaction product of at least silver and vanadium.

One preferred mixed metal oxide is a transition metal oxide having the general formula $SM_xV_2O_y$, where SM is a metal selected from Groups IB to VIIB and VIII of the Periodic Table of Elements, and wherein x is about 0.30 to 2.0 and y is about 4.5 to 6.0 in the general formula. One exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al. This patent is assigned to the assignee of the present invention and incorporated herein by reference.

Another preferred composite transition metal oxide cathode material includes $V_2O_z$ wherein z≦5 combined with $Ag_2O$ having silver in either the silver(II), silver(I) or silver (0) oxidation state and CuO with copper in either the copper (II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about 0.01≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

In a broader sense, the first active material of the present cathode designs is any material which has a relatively higher energy density but a relatively lower rate capability than the second active material. In addition to fluorinated carbon, $Ag_2O$, $Ag_2O_2$, $CuF_2$, $Ag_2CrO_4$, $MnO_2$, and even SVO in any one of its phases, are useful as the first active material. In addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the second active material. For example, SVO can be the first active material when CSVO is the second.

This means that the present invention broadly defines a cathode configuration comprising: first active material/first current collector/second active material/second current collector/third active material, where the first and third active materials can be the same or different, but are of a material or materials that have a relatively higher rate capability, but a lower energy density than the second active material. The second active material has a relatively higher energy density, but a lower rate capability than both the first and third active materials, regardless whether they are the same or different.

Before fabrication into an electrode for incorporation into an electrochemical cell, the first and second cathode active materials are preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the respective cathode active materials.

Cathode components for incorporation into an electrochemical cell may be prepared by rolling, spreading or pressing the first and second cathode active materials onto a suitable perforated current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred current collector material is of perforated titanium, and most preferably the titanium cathode current collector has a thin layer of graphite/carbon applied thereto, especially on the side contacting the $CF_x$. Cathodes prepared as described above are in the form of one or more plates electrically associated with one or more anode plates in a so called multiplate design or the cathode plates are interleaved between folds of an elongated anode plate provided in a serpentine as described in U.S. Pat. No. 4,830,940 to Keister et al. The cathode can also be provided as a strip wound with a corresponding strip of anode material in a structure similar to a "jellyroll".

In order to prevent internal short circuit conditions, the cathode is separated from the lithium-containing anode by a suitable separator material. The separator is of electrically insulative material that is chemically unreactive with the anode and cathode active materials and both chemically unreactive with and insoluble in the electrolyte. In addition, the separator material has a degree of porosity sufficient to allow flow there through of the electrolyte during electrochemical reactions of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell further includes a nonaqueous, ionically conductive electrolyte which serves as a medium for migration of ions between the anode and the cathode during electrochemical reactions. The electrochemical reaction at the electrodes involves conversion of ions in atomic or molecular forms which migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. The lithium salt serves as the vehicle for migration of the lithium ions to intercalate or react with the cathode active materials and suitable ones include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. The electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

According to the present invention, $CF_x$ cathode material, which provides a relatively low power or rate capability but a relatively high energy density or volumetric capability, and SVO cathode material, which has a relatively low energy density but a relatively high rate capability, are individually pressed on opposite sides of a current collector screen. This puts both cathode materials in direct contact with the current collector. One exemplary cathode has the following configuration:

SVO/first current collector/$CF_x$/second current collector/SVO

This sandwich cathode configuration is described in U.S. Pat. No. 6,551,747 to Gan. Broadly, the cathode comprises a first current collector spaced from a second current collector by an intermediate first cathode active material. A second cathode active material contacts the first current collector opposite the first cathode active material. A third cathode active material contacts the second current collector opposite the first cathode active material. This provided the first cathode material "sandwiched" between the current collectors and between the second and third cathode active materials. The second and third active materials are the same or different, as long as each of them meets the criteria that they have a higher rate capability, but a lower energy density than the first cathode active material. Preferably, the second and third active materials are the same as each other, for example SVO, but different than the first active material, which is, for example $CF_x$.

The above described sandwich cathode construction is a significant advancement in electrochemical cells used for high rate discharge applications, such as are required for powering cardiac defibrillators, and the like. This is because the high volumetric capacity $CF_x$ active material is quantitatively converted into or used as the high power energy of the SVO material. It is believed that during high energy pulsing, all the discharge energy is provided by the SVO material. Above the discharge voltage of the $CF_x$ active material, the SVO material provides all of the energy for pulsing as well as for any background load discharging. Under these conditions, the $CF_x$ active material is polarized with respect to the SVO material. Then, when the lithium cell is discharged to the working voltage of the $CF_x$ material, both the SVO and $CF_x$ active materials provide the energy for background load discharging. However, only the SVO material provides energy for high rate pulse discharging. After the SVO active material is pulse discharged, such as during activation of the cardiac defibrillator, the potential of the SVO material tends to drop due to loss of capacity. Then, when the SVO background voltage drops below the working voltage of the $CF_x$ material, the SVO material is believed to be charged by the $CF_x$ material to bring the discharge voltage of the disparate cathode materials to an equal value. In that respect, it is believed that the SVO material acts as a rechargeable electrode while at the same time the $CF_x$ material acts as a charger or energy reservoir. As a result, both active materials reach end of service life at the same time. This is the case regardless of the use of the cell. Since both electrode materials reach end of service life at the same time, no energy capacity is wasted.

In addition to the exemplary sandwich cathode of: SVO/first current collector/$CF_x$/second current collector/SVO, other embodiments that exhibit similar discharge characteristics have the following configurations:

SVO/first current collector/SVO/$CF_x$/SVO/second current collector/SVO

SVO/$CF_x$/current collector/$CF_x$/SVO

SVO/current collector/$CF_x$, with the SVO facing the anode $CF_x$/first current collector/SVO/second current collector/$CF_x$ $CF_x$/first current collector/$CF_x$/SVO/$CF_x$/second current collector/$CF_x$ $CF_x$/first current collector/SVO, with the $CF_x$ facing the anode Preferred are those embodiments in which the high capacity material having the low rate capability is positioned between two layers of high rate cathode material (either high or low capacities). In other words, preferably the exemplary $CF_x$ material never directly faces the lithium anode. In addition, the low rate cathode material must be short circuited with the high rate material, either by direct contact as demonstrated above in the second example, or by parallel connection through the perforated current collectors as in the first above illustrated embodiment.

Cells of the present invention are particularly well suited for powering implantable medical devices requiring a relatively low to medium discharge rate. An exemplary device is a cardiac pacemaker. In such devices, it is important to have a reliable and predictable end-of-life (EOL) or end-of-replacement indicator (ERI) for the device. While Li/CF$_x$ cells are generally acceptable as a power source for these types of applications, this chemistry has a relatively flat or constant discharge curve until just before end of life, when it becomes somewhat steep. This makes it difficult for a medical professional to plan replacement surgery.

Silver vanadium oxide, and in particular, ε-phase silver vanadium oxide (AgV$_2$O$_{5.5}$), has a theoretical volumetric capacity of 1.37 Ah/ml. By comparison, the theoretical volumetric capacity of CF$_x$ material (x=1.1) is 2.42 Ah/ml, which is 1.77 times that of ε-phase silver vanadium oxide. Since CF$_x$ material has significantly higher volumetric capacity than that of SVO material, in order to optimize the final cell capacity, the amount of CF$_x$ material should be maximized and the amount of SVO material should be minimized to the extent that it is still practical in engineering and acceptable in electrochemical performance. Further, end of service life indication is the same as that of a standard Li/SVO cell.

Therefore, in addition to augmenting the discharge performance of a Li/CF$_x$ cell, the SVO cathode material provides a predictable and familiar EOL discharge curve. FIG. 1 is a graph constructed from the pulse discharge of various SVO/current collector/CF$_x$/current collector/SVO cells. Curve 10 was constructed from the background, pre-pulse voltage of such a lithium cell and illustrates that the SVO component is the power source from about 3.6 volts through the first voltage plateau at about 3.2 volts to about 2.8 volts (region 10A). At about 2.8 volts, the CF$_x$ component is discharged until about 2.6 volts (region 10B), at which time the CF$_x$ material is essentially depleted. Then, the SVO material is discharged again to EOL at 2.0 volts. The discharge of a Li/SVO cell at about 2.6 volts is referred to as the second voltage plateau (region 10C). In this manner, the present cathode configuration provides a lithium cell with a very reliable and predictable EOL indication for replacement surgery. This makes the present cell particularly useful for powering an implantable medical device, such as a cardiac pacemaker, cardiac defibrillator, drug pump, nerve stimulator, and the like.

The ability of the present cell to provide high current pulses while maintaining high voltage and acceptable capacitor charge times is highly dependent on the amount of anode material in the cell. If the capacity of the anode relative to the cathode is too low, the lithium will be consumed prematurely resulting in "holes" in the anode. These "holes" reduce the cell's pulsing power by increasing impedance and reducing discharge voltage during pulsing. This will pre-maturely render the cell ineffective. On the other hand, if the capacity of the anode relative to the cathode is too high, there will be considerable lithium material remaining after complete depletion of the cathode. Since consumption of the cathode will necessitate replacement of the cell, this extra lithium serves no purpose and merely consumes valuable space, thus making the cell larger than it needs to be.

In the present invention cell, the anode coulombic capacity is equal to at least the sum of 40% of the coulombic capacity of the high rate material and 80% of the coulombic capacity of the high energy density material. For the preferred active materials, the lithium coulombic capacity is equal to at least the sum of 40% of the SVO coulombic capacity and 80% of the CF$_x$ coulombic capacity. This coulombic capacity ratio results in the cell reaching end of its discharge life at a voltage of about 2.6 V, which corresponds to the end of the second discharge plateau (region 10C in FIG. 1). The gram amount capacity of lithium is 3,860 mAh/grams, the gram amount capacity of SVO is 315 mAh/grams and the gram amount capacity of CF$_x$ is 875 mAh/grams. The term "gram amount capacity" is defined as the mass of the active material itself without electrode additives such as binder or conductive materials. Also, the ratio of anode capacity to cathode capacity only includes electrode materials that are directly opposed by the other electrode. Electrode material that does not directly face an opposite polarity electrode material is sometimes present for the sake of manufacturing simplicity, but is not considered when calculating the cell's coulombic capacity ratio. In that respect, the minimum ratio of anode capacity to cathode capacity is a function of the ratio of the high rate material or materials to the high energy density material or the ratio of SVO to CF$_x$ in the cell.

Additionally, it is desirable that the anode coulombic capacity not exceed the total coulombic capacity of the high rate material or materials and the high energy density material by more than 25%. For the preferred active materials, the lithium coulombic capacity should not exceed the total coulombic capacities of SVO and CF$_x$ by more than 25%. In fact, a 15% excess of lithium results in complete utilization of the SVO and CF$_x$ cathode materials. However, because of variation in anode and cathode weight associated with manufacturing processes, a nominal 25% excess of lithium capacity is used. Also, a nominal 25% excess of lithium capacity prevents development of lithium deficient regions or "holes" in the anode. These regions are the result of anode utilization not being entirely uniform and results in increased impedance and reduced cell effectiveness prior to complete cathode discharge. Use of more than a 25% excess of anode material in the cell, however, consumes space without increasing useful cell capacity. This reduces the energy density and longevity of the cell.

According to the present invention, the lithium anode is consumed at between the end of the second discharge plateau (region 10B of FIG. 1) and the end of the third plateau (region 10C). It is not desirable to have the anode consumed prior to the end of the second discharge plateau because this results in poor cathode material utilization and reduced energy density. As previously discussed, however, too much lithium results in reduced cell energy density.

However, in some cases it may be desirable to design the anode-to-cathode capacity ratio so that the lithium anode is depleted prior to the third discharge plateau (region 10C). This is because irreversible cell impedance growth and voltage delay are associated with the region between the second and third discharge plateaus (between regions 10B and 10C of FIG. 1). In the case where the lithium anode is consumed prior to this transition, the problem of time-based impedance growth is eliminated. Instead, the cell exhibits predictable and acceptable discharge voltages during pulsing, reasonable capacitor charge time, and enhanced device effectiveness. Alternatively, it may be useful to have enough lithium material to utilize some or the entire third discharge plateau (region 10C). This would extend device longevity and provide suitable power between the cell reaching its voltage-based replacement indicator and when cell replacement actually occurs.

It is particularly preferred that the anode-to-cathode capacity ratio be from about 1.15 to about 1.20. In that case, the cell replacement indicator is conveniently located between the second and third discharge plateaus (between regions 10B and 10C of FIG. 1). The rapid voltage drop in this transition region allows for accurate indication of the replacement voltage with minimal wasted capacity. The third discharge plateau (10C) is then used to power the device until it can be replaced. By using a ratio of from about 1.15 to about 1.20, the entire third plateau is available to provide sufficient replacement time. Use of a higher ratio serves no useful purpose, and only reduces the cell's energy density.

In summary, for the preferred SVO and $CF_x$ active materials, the cell has an anode-to-cathode coulombic capacity ratio such that the lithium capacity is greater than the sum of 40% of the SVO coulombic capacity and 80% of the $CF_x$ coulombic capacity, but less than 125% of the total cathode capacity. Only the capacity of the electrode materials directly opposed by each other is considered for the purposes of calculating these ratios. Accordingly, the present invention is defined by the following equation:

$$[0.80(M_{CFx} \times Q_{CFx}) + 0.40(M_{SVO} \times Q_{SVO})] < Q_{anode} < [(M_{CFx} \times Q_{CFx}) + (M_{SVO} \times Q_{SVO})] \times 1.25,$$

where: $M_{CFx}$=the mass of $CF_x$ in grams, $M_{SVO}$=the mass of SVO in grams, $Q_{CFx}$=the capacity of $CF_x$ in mAh, $Q_{SVO}$=the capacity of SVO in mAh, and $Q_{anode}$=the capacity of the anode in mAh. However, in a broader light, the present invention is directed to a cathode comprising: a first cathode active material/first current collector/second cathode active material/second current collector/third cathode active material, wherein the first and third cathode active materials are the same or different and are of a material or materials that have a relatively higher rate capability, but a lower energy density than the second cathode active material, wherein the first cathode active material has a first cathode coulombic capacity, the second cathode active material has a second coulombic capacity and the third cathode active material has a third coulombic capacity. A ratio of the anodic coulombic capacity to the total coulombic capacities of the first, second and third cathode active materials is determined by the following equation: $0.40 [\% HR(M_{1CAM} \times Q_{1CAM}) + (1-\% HR) (M_{3CAM} \times Q_{3CAM})] + 0.80 (M_{2CAM} \times Q_{2CAM}) < Q_{anode} < [(M_{1CAM} \times Q_{1CAM}) + (M_{2CAM} \times Q_{2CAM}) + (M_{3CAM} \times Q_{3CAM})] \times 1.25$, wherein $M_{1CAM}$=the mass of the first cathode active material in grams, $Q_{1CAM}$=the capacity of the first cathode active material in mAh, $M_{2CAM}$=the mass of the second cathode active material in grams, $Q_{2CAM}$=the capacity of the second cathode active material in mAh, $M_{3CAM}$=the mass of the third cathode active material in grams, $Q_{3CAM}$=the capacity of the third cathode active material in mAh, and $Q_{anode}$=the capacity of the anode in mAh.

The preferred form of the electrochemical cell is a case-negative design wherein the anode is in contact with a conductive metal casing and the cathode current collectors are weld contacted to a positive terminal pin extending from the current collectors. A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode. The anode is preferably connected to the case or the lid. An additional opening is provided for electrolyte filling. The cell is thereafter filled with the electrolyte solution described hereinabove and hermetically sealed, such as by close-welding a titanium plug over the fill hole. The cell of the present invention can also be constructed in a case-positive design.

The following example describes the manufacture of a cell according to the present invention:

EXAMPLE

Several sample cells were built using various anode-to-cathode ratios. The cathode assemblies were prepared by pressing approximately 337 mg of $CF_x$ in a matrix of binder and conductive additive between two titanium current collector screens. Approximately 246 mg of silver vanadium oxide in a matrix of binder and conductive additive was pressed on both sides of this assembly to provide a cathode having the configuration: SVO/current collector screen/$CF_x$/current collector screen/SVO. The total surface area of each cathode assembly was about 15 cm². The total capacity of each cathode assembly was 0.337×0.875+0.246×0.315×2=0.450 Ah. The minimum opposing anode capacity as defined by the present invention is therefore calculated from the formula: (0.337×0.875×0.8)+(0.246×0.315×2×0.40)=0.298 Ah. The maximum opposing anode capacity is equal to 0.45×1.25=0.563 Ah. The cathode assembly was heat-sealed inside a polyethylene separator.

The cathode assemblies were combined with a lithium metal ribbon applied to a nickel current collector. Five test cell groups were prepared, each using different lithium ribbon thicknesses. The lithium thicknesses were 0.0048 in., 0.0055 in., 0.0058 in., 0.0066 in. and 0.0069 in. The anode-to-cathode capacity ratio for the five groups was 0.83 (Group 1), 0.96 (Group 2), 1.01 (Group 3), 1.16 (Group 4) and 1.21 (Group 5). The anode was heat-sealed in a polyethylene separator and the cell assembly was placed in a hermetic stainless steel can filled with an electrolyte consisting of 1M $LiAsF_6$ in PC:DME (1/1, v/v) containing 0.05M dibenzyl carbonate (DBC). Each cell consisted of six cathode assemblies interleaved between folds of a serpentine anode (U.S. Pat. No. 4,830,940 to Keister et al.).

The cells were fitted with a 19.6 kohm resistor bridging between the anode and cathode. They were then stored at 37° C. for 21 months. Storage was briefly interrupted every 56 days when the cells were subjected to a four-pulse train. The train consisted of four 10-second pulses interspersed by a 15-second rest period between each pulse. The pulse current was equal to 37 mA/cm² of cathode surface area. When the cell voltage reached 2.6 V, the pulse frequency was increased to every seven days. The experimental results are shown in FIG. 1.

As previously discussed, curve 10 was constructed from the average background, pre-pulse voltages prior to each pulse train of the cells. All of the test groups looked identical in terms of pre-pulse voltage. The remaining curves were constructed from the respective cell potentials at the end of the first pulse of each pulse train. The curve labeled 12 (open triangle) is from the cell having the anode capacity equal to 0.83 times the cathode capacity, the curve labeled 14 (open square) is from the cell having the anode capacity equal to 0.96 times the cathode capacity, the curve labeled 16 (open diamond) is from the cell having the anode capacity equal to 1.01 times the cathode capacity, the curve labeled 18 (open circle) is from the cell having the anode capacity equal to 1.16 times the cathode capacity, and the curve labeled 20 (star) is from the cell having the anode capacity equal to 1.21 times the cathode capacity. The cathode material primarily being discharged at any point on the background voltage curve 10 is indicated by bracketed regions 10A, 10B and 10C.

The pulse potentials were significantly affected by the amount of anode material in the cell. Pulse potentials rapidly dropped at a lower cathode depth-of-discharge (DoD) when thinner lithium ribbons were used (curves 12, 14 and 16). There was no increase in performance above a ratio of 1.15, however. The lowest ratio tested of 0.83 still had significant pulsing capacity available on the third discharge plateau (region 10C). From this example, the minimum ratio of anode to cathode capacity is 0.66 according to the present invention.

However, the cell pulse voltage drops rapidly at the end of the second discharge plateau (region 10B).

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode of lithium having an anodic coulombic capacity;
   b) a cathode comprising the configuration: silver vanadium oxide (SVO)/first current collector/fluorinated carbon ($CF_x$), wherein in a freshly built cell, a ratio of the anodic coulombic capacity to the total coulombic capacities of SVO and $CF_x$ is in a range of: $[0.80(M_{CFx} \times Q_{CFx}) + 0.40(M_{SVO} \times Q_{SVO})] < Q_{anode} < [(M_{CFx} \times Q_{CFx}) + (M_{SVO} \times Q_{SVO})] \times 1.25$, wherein $M_{CFx}$=the mass of $CF_x$ in grams, $M_{SVO}$=the mass of SVO in grams, $Q_{CFx}$=the capacity of $CF_x$ in mAh, $Q_{SVO}$=the capacity of SVO in mAh, and $Q_{anode}$=the capacity of the anode in mAh;
   c) a separator disposed between the anode and cathode to prevent direct physical contact between them; and
   d) a nonaqueous electrolyte activating the anode and the cathode.

2. The electrochemical cell of claim 1 wherein a ratio of the anodic coulombic capacity to the total coulombic capacities of SVO and $CF_x$ is from about 1.15 to about 1.2.

3. The electrochemical cell of claim 1 wherein the SVO faces the anode.

4. The electrochemical cell of claim 1 wherein the cathode has the configuration: SVO/first current collector/$CF_x$/second current collector/SVO.

5. The electrochemical cell of claim 4 wherein a ratio of the anodic coulombic capacity to the total coulombic capacities of SVO and $CF_x$ is from about 1.15 to about 1.2.

6. An electrochemical cell, which comprises:
   a) an anode of lithium having an anodic coulombic capacity;
   b) a cathode having a configuration selected from the group consisting of: SVO/first current collector/$CF_x$/second current collector/SVO and SVO/first current collector/SVO/$CF_x$/SVO/second current collector/SVO, wherein in a freshly built cell, a ratio of the anodic coulombic capacity to the total coulombic capacities of SVO and $CF_x$ is in a range of: $[0.80(M_{CFx} \times Q_{CFx}) + 0.40(M_{SVO} \times Q_{SVO})] < Q_{anode} < [(M_{CFx} \times Q_{CFx}) + (M_{SVO} \times Q_{SVO})] \times 1.25$, wherein $M_{CFx}$=the mass of $CF_x$ in grams, $M_{SVO}$=the mass of SVO in grams, $Q_{CFx}$=the capacity of $CF_x$ in mAh, $Q_{SVO}$=the capacity of SVO in mAh, and $Q_{anode}$=the capacity of the anode in mAh;
   c) a separator disposed between the anode and cathode to prevent direct physical contact between them; and
   d) a nonaqueous electrolyte activating the anode and the cathode.

7. The electrochemical cell of claim 6 wherein a ratio of the anodic coulombic capacity to the total coulombic capacities of the SVO and $CF_x$ is from about 1.15 to about 1.2.

8. The electrochemical cell of claim 6 wherein the first and second current collectors are perforated and selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

9. The electrochemical cell of claim 6 wherein the first and second current collectors are titanium having a coating selected from the group consisting of graphite/carbon material, iridium, iridium oxide and platinum provided thereon.

10. An electrochemical cell, which comprises:
    a) an anode of lithium;
    b) a cathode having a configuration selected from the group consisting of: SVO/first current collector/$CF_x$/second current collector/SVO, SVO/first current collector/SVO/$CF_x$/SVO/second current collector/SVO, SVO/$CF_x$/current collector/$CF_x$/SVO, $CF_x$/first current collector/SVO/second current collector/$CF_x$, and $CF_x$/first current collector/$CF_x$/SVO/$CF_x$/second current collector/$CF_x$, wherein in a freshly built cell, a ratio of the anodic coulombic capacity to the total coulombic capacities of SVO and $CF_x$ is in a range of: $[0.80(M_{CFx} \times Q_{CFx}) + 0.40(M_{SVO} \times Q_{SVO})] < Q_{anode} < [(M_{CFx} \times Q_{CFx}) + (M_{SVO} \times Q_{SVO})] \times 1.25$, wherein $M_{CFx}$=the mass of $CF_x$ in grams, $M_{SVO}$=the mass of SVO in grams, $Q_{CFx}$=the capacity of $CF_x$ in mAh, $Q_{SVO}$=the capacity of SVO in mAh, and $Q_{anode}$=the capacity of the anode in mAh;
    c) a separator disposed between the anode and cathode to prevent direct physical contact between them; and
    d) a nonaqueous electrolyte activating the anode and the cathode.

11. A method for providing an electrochemical cell, comprising the steps of:
    a) providing a cathode comprising: silver vanadium oxide (SVO)/first current collector/fluorinated carbon($CF_x$), and determining a ratio of the anodic coulombic capacity to the total coulombic capacities of SVO and $CF_x$ by the following equation: $[0.80(M_{CFx} \times Q_{CFx}) + 0.40(M_{SVO} \times Q_{SVO})] < Q_{anode} < [(M_{CFx} \times Q_{CFx}) + (M_{SVO} \times Q_{SVO})] \times 1.25$, wherein $M_{CFx}$=the mass of $CF_x$, in grams, $M_{SVO}$=the mass of SVO in grams, $Q_{CFx}$=the capacity of $CF_x$ in mAh, $Q_{SVO}$=the capacity of SVO in mAh, and $Q_{anode}$=the capacity of the anode in mAh;
    b) providing an anode comprising lithium having an anodic coulombic capacity;
    c) providing the anodic coulombic capacity being equal to or greater than the sum of 40% of the gram amount coulombic capacity of the SVO plus 80% of the gram amount coulombic capacity of the $CF_x$;
    d) providing a separator intermediate the anode and cathode to prevent direct physical contact between them;
    e) housing the anode and cathode in a casing; and
    f) activating the anode and cathode with a nonaqueous electrolyte provided in the casing.

12. The method of claim 11 including providing a ratio of the anodic coulombic capacity to the total coulombic capacities of the SVO and $CF_x$ being from about 1.15 to about 1.2.

13. The method of claim 11 including providing the cathode having the configuration: SVO/first current collector/$CF_x$/second current collector/SVO.

14. The method of claim 13 including providing a ratio of the anodic coulombic capacity to the total coulombic capacities of SVO and $CF_x$ is from about 1.15 to about 1.2.

* * * * *